June 30, 1942.  R. H. MacKINNON  2,287,895
SECONDARY RACK CONSTRUCTION
Filed Dec. 29, 1939
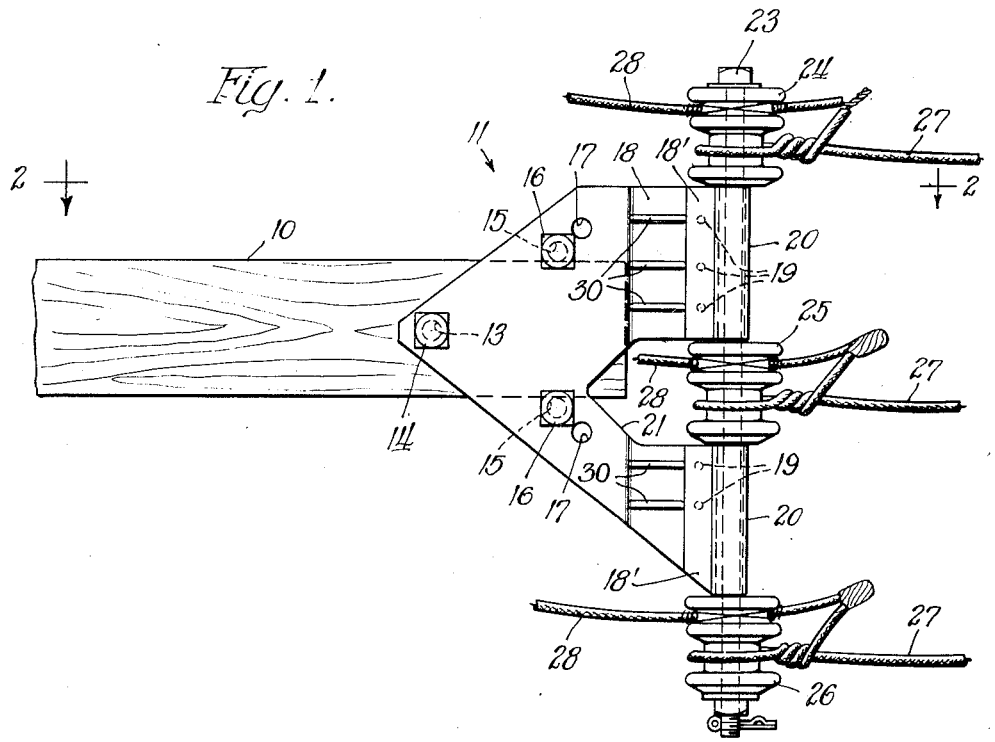
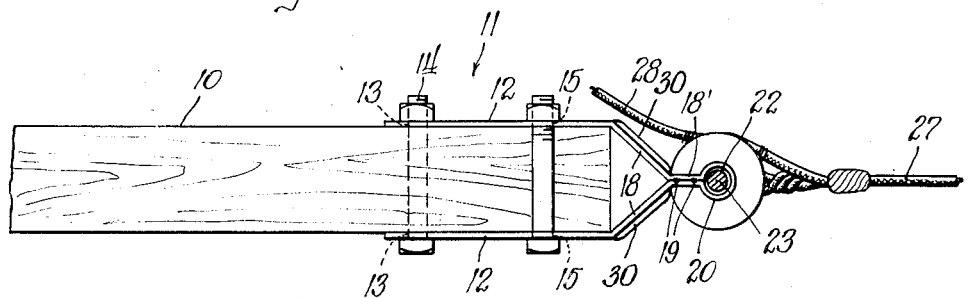
Inventor:
Russell H. MacKinnon.

Patented June 30, 1942

2,287,895

UNITED STATES PATENT OFFICE 2,287,895

SECONDARY RACK CONSTRUCTION

Russell H. MacKinnon, Evanston, Ill., assignor of one-half to Eugene C. Black, Evanston, Ill.

Application December 29, 1939, Serial No. 311,502

6 Claims. (Cl. 248—67.7)

My invention relates generally to electrical conductor mounting devices and it has particular relation to secondary rack construction.

An object of my invention is to provide for mounting one or more insulators at the end of a cross arm in a new and improved manner.

Another object of my invention is to construct a bracket from one piece of sheet metal for mounting one or more insulators at the end of a cross arm.

A further object of my invention is to form and fold a single piece of sheet metal so as to provide a generally V-shaped bracket, with the portions forming the apex of the V spaced apart for receiving the end of a cross arm, with the folded spaced end portions of the V forming apertures for receiving an insulator support pin, and with the sections between the spaced apart portions and the apertures for the support pin being fastened together.

Other objects of my invention will, in part, be obvious, and, in part, appear hereinafter.

My invention accordingly is disclosed in the embodiment thereof shown in the accompanying drawing and it comprises the features of construction, combination of elements and arrangement of parts which will be exemplified in the construction hereinafter set forth and the scope of the application of which will be indicated in the appended claims.

For a more complete understanding of the nature and scope of my invention reference may be had to the following detailed description taken in connection with the accompanying drawing, in which:

Figure 1 is a view in side elevation of my improved secondary rack mounted on one end of a cross arm; and Figure 2 is a detail sectional view taken along the line 2—2 of Figure 1.

Referring to the drawing, it will be observed that the reference character 10 designates a cross arm, which may be of wood, and which may be mounted on a suitable pole. A bracket, shown generally at 11, is arranged to be positioned on one end of the cross arm 10 and to constitute an extension thereof. As will hereinafter appear, the bracket 11 is formed of a single piece of sheet metal that is suitably formed and folded so as to provide a generally triangular or V-shaped bracket. The bracket 11 is preferably galvanized to make it weather resistant.

The apex of the V-shaped bracket 14 is formed by portions 12 which are spaced apart so as to snugly fit against the opposite sides of the cross arm 10. Alined bolt holes 13 are provided in the portions 12 for receiving a bolt 14 which extends through the cross arm 10 as shown. Additional alined bolt holes 15 are provided in the portions 12 and they are so spaced that when bolts 16 are positioned therein these bolts extend along the upper and under surfaces of the cross arm 10, as is shown more clearly in Figure 1. In the event that the cross arm 10 should longitudinally crack because of the presence therein of the aperture 13 for the bolt 14, the bolts 16 prevent spreading thereof such as might permit the bracket 11 to be pulled off of the cross arm 10 if it spread far enough to allow the bolt 14 to be pulled through the crack.

In order to adapt the bracket 11 for use with a wider cross arm, alined bolt holes 17 are also provided in the portions 12 in which the bolts 16 can be optionally inserted as will be readily understood.

If the material forming the bracket 11 is of sufficient thickness or rigidity, one of the portions 12 may be omitted. In such case the single remaining portion 12 would assume the form of a flat plate and a suitable length of strap iron would be employed having apertures corresponding to the apertures 15 for cooperating with the bolts 16 to hold the bracket in place on the cross arm 10.

The portions 12 forming the apex of the V are extended and formed to provide portions 18 which are bent at suitable angles toward each other. Preferably, the portions 18' are juxtaposed and fastened together, as by welding, as indicated at 19, or any other suitable means such as bolts. The folded end portions 20 of the V-shaped bracket 11 are spaced apart to provide a notched opening 21 therebetween. They are also formed to provide alined apertures 22, which, it will be observed are parallel to the portions 12, for receiving a pin 23 that is arranged to support spool type insulators 24, 25 and 26. It will be noted that the insulator 25 is positioned on the pin 23 in the notched opening 21 between the end portions 20, and that the insulators 24 and 26 are positioned at the ends of the pin 23 above and below the end portions 20, respectively.

The insulators 24, 25 and 26 are arranged to have fastened thereto branch conductors 27 that are connected to line conductors 28. It will be understood that the branch conductors 27 will ordinarily be the conductors which extend to a dwelling or the like while the line conductors 28 are connected to the secondary winding of a distribution transformer which is used for stepping down a relatively high transmission voltage to voltages that are suitable for domestic use, such as 115 and 230 volts.

While the construction of the bracket 11 as shown in the drawing and described hereinbefore is relatively sturdy and is capable of withstanding the usual stresses incident to secondary rack construction, its resistance to deformation can be increased somewhat by providing ribs 30 on the portions 18 of the bracket 11 which extend toward each other. It will be noted that substantially all of the bracket 11 is stressed in tension and thus maximum efficiency is obtained in the sheet metal construction thereof since this material is strongest in tension.

Since certain further changes may be made in the foregoing construction and different embodiments of the invention can be made without departing from the scope thereof, it is intended that all matters shown in the accompanying drawing and described hereinbefore shall be interpreted as illustrative and not in a limiting sense.

I claim as my invention:

1. As an article of manufacture, a bracket for mounting insulators for receiving line conductors one above the other at the end of a cross arm and forming an endwise extension thereof to which it is adapted to be secured, comprising a one piece sheet metal member folded back on itself to provide a generally triangular configuration with the folded edge forming the base and adapted to be spaced from said one end of the cross arm and to extend at right angles thereto, the portions adjacent the apex opposite the base being in parallel spaced relation for receiving therebetween said one end of the cross arm, there being alined bolt holes in said portions for bolting the bracket to the cross arm, the folded edge portion being shaped to receive an insulator support pin for supporting said insulators one above and the other below the bracket, said triangular configuration providing a considerable degree of clearance between said insulators and the cross arm.

2. A secondary insulator rack for mounting on one end of a cross arm and constituting an endwise extension thereof comprising, in combination, platelike means arranged to be positioned along a side of said cross arm at one end, and means at the outer end of said platelike means for mounting at least one insulator, there being at least two pairs of differently spaced apart apertures in said platelike means intermediate its ends for receiving bolts or the like, each pair corresponding to and arranged to accommodate different widths of cross arms, and there being at least one aperture adjacent the inner end of said platelike means for receiving a bolt or the like extending through said cross arm, said pairs of apertures being so spaced as to receive therebetween said different widths of cross arms whereby the bolts therefor extend across the upper and lower surfaces of said cross arm and not through the same to prevent spreading thereof in the event that it cracks longitudinally because of the presence of an aperture for receiving said bolt, said platelike means being stressed substantially only in tension.

3. A secondary insulator rack for mounting on one end of a cross arm and constituting an endwise extension thereof comprising, in combination, a bracket having a pair of unconnected platelike side members in parallel spaced relation for engaging opposite sides of the cross arm, and means at the outer end of said bracket for mounting at least one insulator, there being at least two pairs of differently spaced apart alined apertures in said side members intermediate their ends for receiving through bolts or the like, each pair of aligned apertures corresponding to and arranged to accommodate different widths of cross arms, and there being at least one aperture adjacent the inner end of each side member alined with the corresponding other aperture for receiving a through bolt or the like extending through said cross arm, said pairs of apertures being so spaced as to receive therebetween said different widths of cross arms whereby the bolts therefor extend across the upper and lower surfaces of said cross arm and not through the same to prevent spreading thereof in the event that it cracks longitudinally because of the presence of an aperture for receiving said bolt, said platelike side members being stressed substantially only in tension.

4. A bracket for mounting on a cross arm so as to constitute an endwise extension thereof for carrying insulators to which conductors are secured comprising, a one piece sheet metal member folded back on itself to provide a generally V-shaped construction with the portions forming the apex of the V in spaced parallel relation for receiving therebetween the end of the cross arm, there being at least two pairs of differently spaced apart aligned apertures in said portions intermediate their ends for receiving clamp bolts, each pair corresponding to and arranged to accommodate different widths of cross arms, there being at least one pair of aligned apertures in said portions adjacent the apex of the V for also receiving a clamp bolt, the intermediate portions forming the arms of the V being inclined from said apex portions at the end of the cross arm so that they abut throughout their widths and being inseparably secured together along their juncture, and the outer end portions of the arms of the V being formed to define aligned tubular portions so as to provide aligned openings extending at right angles to the cross arm for receiving a pin therein adapted to have mounted thereon an insulator at each end and an insulator between the arms of the V.

5. As an article of manufacture, a bracket for mounting an insulator pin and insulators and forming an endwise extension of a cross arm to one end of which it is adapted to be secured, comprising a one piece sheet metal member folded back on itself with the portions opposite the folded edge in parallel spaced relation for receiving therebetween the end of the cross arm, there being a pair of aligned bolt holes in said portions adjacent their outer ends for receiving a bolt extending through said cross arm, there being two pairs of aligned bolt holes in said portions intermediate their ends so spaced as to receive bolts extending across the upper and under surfaces of said cross arm in close proximity thereto but not through the same so as to prevent spreading thereof in the event of its cracking longitudinally as a result of the presence of an aperture therein for receiving said bolt, the folded edge portion being shaped to receive the insulator pin.

6. A bracket for mounting on a cross arm so as to constitute an endwise extension thereof for carrying insulators to which conductors are secured comprising, a one piece sheet metal member folded back on itself to provide a generally V-shaped construction with the portions forming the apex of the V in spaced parallel relation for receiving therebetween the end of the cross arm, the intermediate portions forming the arms of the V being inclined from said apex portions at the end of the cross arm so that they abut throughout their widths and being inseparably secured together along their juncture, and the outer end portions of the arms of the V being formed to define aligned tubular portions so as to provide aligned openings extending at right angles to the cross arm for receiving a pin therein adapted to have mounted thereon an insulator at each end and an insulator between the arms of the V.

RUSSELL H. MacKINNON.